July 26, 1955 G. A. LYON 2,714,041
WHEEL COVER
Filed Feb. 1, 1952
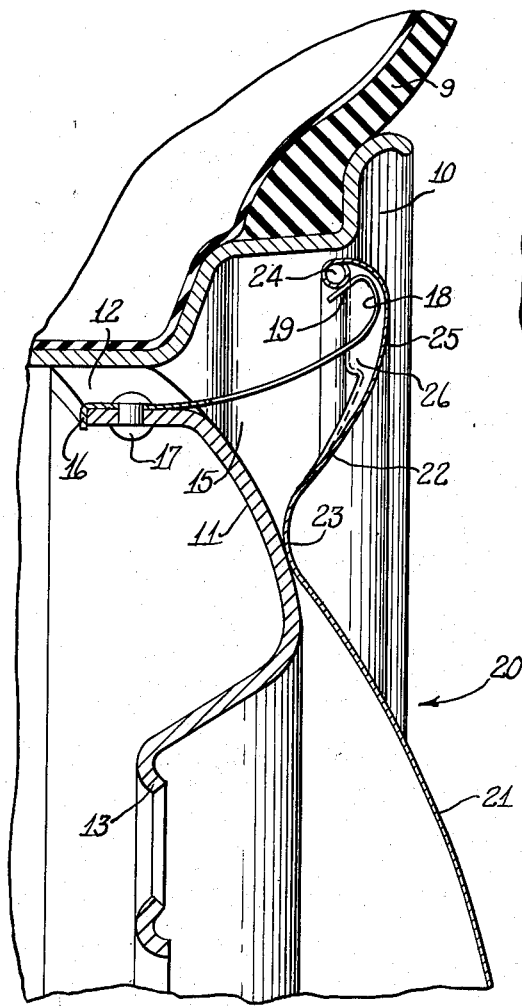
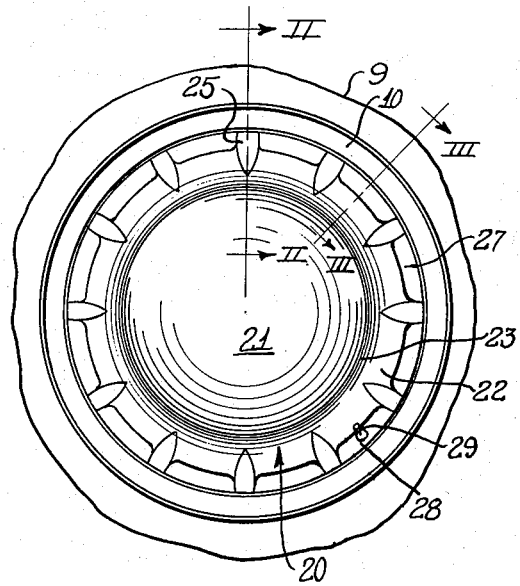
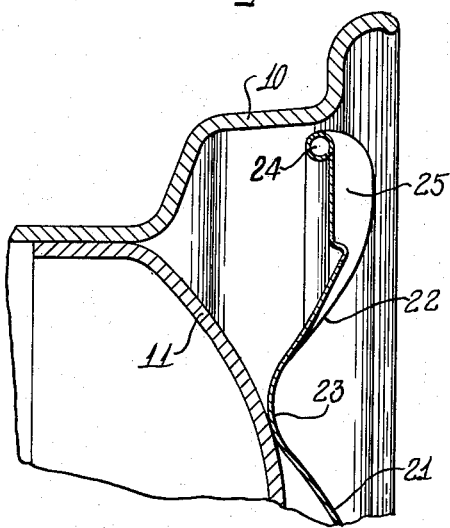
Inventor
George Albert Lyon United States Patent Office 2,714,041
Patented July 26, 1955

2,714,041

WHEEL COVER

George Albert Lyon, Detroit, Mich.

Application February 1, 1952, Serial No. 269,392

8 Claims. (Cl. 301—37)

This invention relates to wheel covers and more particularly to a spoke-simulating wheel cover for automobile wheels.

An object of this invention is to provide a wheel cover with spoke-simulating portions which serve the dual purpose of ornamenting the wheel and, at the same time, providing on their rear sides pockets for receiving the free ends of the cover-retaining spring clips on the wheel.

Another object of this invention is to provide a wheel with ornamental indentations defining pockets for receiving the free ends of spring clips so that the walls of the pockets can cooperate with the spring clips in preventing rotation of the cover on the wheel.

Yet another object of this invention is to provide a wheel cover which cooperates with retaining means on a wheel in such manner that rotation of the cover is prevented, thereby eliminating the likelihood of the cover turning and cutting off the rubber valve stem.

In accordance with the general features of this invention there is provided a circular wheel cover having an annular shoulder engageable by spring clips on the wheel, and having an annular portion adjacent said shoulder formed with a plurality of axially outward spoke-simulating indentations each defining on its rear side a pocket for receiving the free end of an associated clip as the clip is engaged with said shoulder, and each of said pockets leading to and terminating at said shoulder.

Other objects and features of this invention will more fully appear from the following detailed description taken in connection with the accompanying drawings which illustrate several embodiments thereof, and in which:

Figure 1 is a fragmentary side view of a wheel structure having a cover embodying the features of this invention;

Figure 2 is an enlarged fragmentary cross-sectional view taken on substantially the line II—II of Figure 1 looking in the direction indicated by the arrows;

Figure 3 is an enlarged fragmentary cross-sectional view taken on substantially the line III—III of Figure 1 looking in the direction indicated by the arrows; and Figure 4 is a fragmentary cross-sectional view similar to Figure 2 and illustrating a modified way of attaching the spring clip to the wheel.

As shown on the drawings:

The reference character 9 designates generally a conventional pneumatic tire and tube assembly mounted in the usual way upon a conventional multi-flanged drop center type of tire rim 10. This tire rim 10 is carried upon a dished metallic wheel body 11 connected at spaced intervals in the usual way to the base of the rim and so as to provide transverse wheel openings 12 between the body and the rim.

The wheel body 11 has the usual central dished flange 13 by means of which the wheel may be detachably secured by cap screws or bolts (not shown) to a brake drum or the like on an automobile wheel axle.

As is well known in the wheel art, the wheel openings 12 may be of any suitable number such, for example, as 3 to 6 and are intended to provide for the circulation of air through the body of the wheel for the purpose of assisting in cooling the brake drum. Associated with these wheel openings 12 is a plurality of spring clips 15 there being one for each wheel opening. Since the clips are all identical, a description of one will suffice for all.

Each cover-retaining spring clip 15 has a turned edge 16 adapted to hook over a rear edge of the wheel body 11 and is secured to the wheel body inside of the opening by means of a rivet or the like 17. Also each clip has a turned gooseneck-like free extremity 18 terminating in an inclined cover-engaging free leg 19. This leg is disposed at an oblique angle so that it can be cammingly engaged by an edge of a cover 20 as the cover is pressed into the wheel.

The cover 20 embodies the features of this invention and may be made from a stamping of metallic sheet or the like. Excellent results may be obtained by making it from stainless steel sheet or coil stock which lends itself to a highly lustrous finish. The cover 20 includes a central crown portion 21, an outer annular portion 22 diverging therefrom and a junction portion 23 between portions 21 and 22 which is indented axially rearwardly and is adapted to bottom against the wheel body part 11.

The cover 20 terminates at its outer periphery in a rolled or turned edge 24 which defines a pry-off edge for the cover and also defines a shoulder for cover-retaining engagement by the free ends 18 of the spring clips 15.

Located in an annular portion of the cover immediately adjacent the turned edge 24 is a plurality of axially outward indentations 25 each of which defines on its rear side a pocket 26 of generally curved cross-section and of a width sufficient to accommodate the free end 18 of one of the clips 15.

Each pocket 26 is so located as to lead into and terminate at the turned edge 24 of the cover so that the associated spring clip 15 upon entering the pocket can engage the turned edge 24.

In addition the portion 22 of the cover is provided with a valve stem hole 28 to which the free extremity of the usual or customary valve stem 29 from the tire and tube assembly may project in the usual way (Figure 1).

In the application of this wheel cover 20 to the wheel its valve stem hole 28 is aligned with the valve stem 29 and then the cover is pressed axially toward the wheel. The hole 28 if so desired may be slightly elongated to provide for slight angular displacement of the wheel cover on the wheel.

Upon continued axial rearward movement of the cover 20 on the wheel, the free ends of the spring clips 15 will enter the pockets 26 and their free legs 19 will cammingly engage the turned shoulder 24 of the cover until the shoulder snaps over the legs to the position shown in Figure 2. In this position the spring clips exert a resilient gripping engagement on the turned edge 24 tending to pull the cover in toward the wheel, with the portion 23 bottomed against the body part 11.

When it is desired to remove the cover the same may be easily effected by inserting a screwdriver between the rim 10 and the turned edge 24 and by forcibly ejecting the cover 20 from its retained cooperation with the spring clips. The space between the turned edge 24 and the rim 10 also enables air to circulate between the cover and the rim.

If so desired, portions 27 of the cover between the indentations 25 may be colored, thus causing the cover to appear to have holes between the indentations 25.

In Figure 4 I have illustrated a modification of the spring clip attachment and wherein the spring clip 35 is attached at 36 to the base of the tire rim 30 inside the wheel opening 32 defined by the wheel body 31. Otherwise the form of the invention is the same as the above described first form.

It will be understood that modifications and variations may be effected without departing from the scope of the novel concepts of the present invention.

I claim as my invention:

1. In a wheel structure including wheel body and tire rim members, one of said members having projecting therefrom a plurality of circumferentially spaced cover retaining spring clips, and a circular wheel cover having an annular shoulder engageable on its radially inner side by said retaining spring clips and having an annular portion adjacent said shoulder formed with a plurality of axially outward spoke simulating indentations, each defining on its rear side a pocket for receiving the free end of one of said clips as the clips are engaged with said shoulder.

2. In a wheel structure including wheel body and tire rim members, one of said members having projecting therefrom a plurality of circumferentially spaced cover retaining spring clips, and a circular wheel cover having an annular shoulder engageable by said retaining spring clips and having an annular portion adjacent said shoulder formed with a plurality of axially outward spoke simulating indentations, each defining on its rear side a pocket for receiving the free end of one of said clips as the clips are engaged with said shoulder, said shoulder being radially outward of said spoke indentations.

3. In a wheel structure including wheel body and tire rim members, one of said members having projecting therefrom a plurality of circumferentially spaced cover retaining spring clips, and a circular wheel cover having an annular shoulder engageable by said retaining spring clips and having an annular portion adjacent said shoulder formed with a plurality of axially outward spoke simulating indentations, each defining on its rear side a pocket for receiving the free end of one of said clips as the clips are engaged with said shoulder, said shoulder being radially outward of said spoke indentations, each of said indentations being of curved cross-section corresponding generally with the curved shape of the free end of the associated spring clip.

4. In a wheel structure including wheel body and tire rim members, one of said members having projecting therefrom a plurality of circumferentially spacer cover retaining spring clips, and a circular wheel cover having an annular shoulder engageable by said retaining spring clips and having an annular portion adjacent said shoulder formed with a plurality of axially outward spoke simulating indentations, each defining on its rear side a pocket for receiving the free end of one of said clips as the clips are engaged with said shoulder, said shoulder being radially outward of said spoke indentations, said cover being indented axially and radially inward of said spoke indentations for bottoming against the wheel.

5. In a wheel structure including wheel body and tire rim members, one of said members having projecting therefrom a plurality of circumferentially spaced cover retaining spring clips, and a circular wheel cover having an annular shoulder engageable by said retaining spring clips and having an annular portion adjacent said shoulder formed with a plurality of axially outward spoke simulating indentations, each defining on its rear side a pocket for receiving the free end of one of said clips as the clips are engaged with said shoulder, said shoulder being radially outward of said spoke indentations, said cover being indented axially and radially inward of said spoke indentations for bottoming against the wheel, said cover having an outer peripheral margin including said shoulder formed to be spaced from the wheel for the circulation of air therebehind.

6. In a wheel structure including wheel body and tire rim members, one of said members having retaining spring clip means extending generally axially outwardly therefrom and having cover retaining legs thereon, a cover for disposition at the outer side of the wheel having inwardly opening clip receiving pockets therein with shoulder means at said pockets for snap-on pry-off engagement by the clip legs, the pockets being defined by wall portions cooperative with the clips to hold the cover against turning on the wheel.

7. In a wheel structure including tire rim and wheel body members, a sheet metal cover for substantially concealing the tire rim and wheel body members and having a radially spaced series of clip receiving pockets opening inwardly generally opposite juncture of the tire rim and wheel body members, one of said members having retaining clips thereon projecting generally axially outwardly and having clip retaining resilient leg portions, said cover having shoulders at said pockets retainingly engageable by said clip legs, said pockets being defined by walls opposing the sides of the clips adjacent to said clip legs and cooperative with the clips to retain the cover against turning on the wheel.

8. In a wheel structure including a wheel having a tire rim and a body part together with spaced cover retaining means projecting therefrom, a wheel cover therefor comprising a circular member terminating at its outer periphery in an underturned curled cover pry-off continuous annular edge, said cover at said outer periphery having axially outward of and directly opposite said edge a plurality of circumferentially spaced indentations defining rearwardly opening pockets each having its rearward opening for receiving said cover retaining means and partially lapped by said edge, said edge being common to and overlying all of said pockets and comprising a shoulder for reinforcing the cover at said pockets.

References Cited in the file of this patent

UNITED STATES PATENTS

| | | |
|---|---|---|
| D. 101,742 | Lyon | Oct. 27, 1936 |
| 1,188,637 | Ferguson | June 27, 1916 |
| 2,083,066 | Hunt | June 8, 1937 |
| 2,196,718 | Ash | Apr. 9, 1940 |
| 2,237,481 | Ferro | Apr. 8, 1941 |

FOREIGN PATENTS

| | | |
|---|---|---|
| 281,319 | Italy | Jan. 9, 1931 |